(No Model.)
H. G. BORGFELDT.
BICYCLE STEP.
No. 598,356. Patented Feb. 1, 1898.
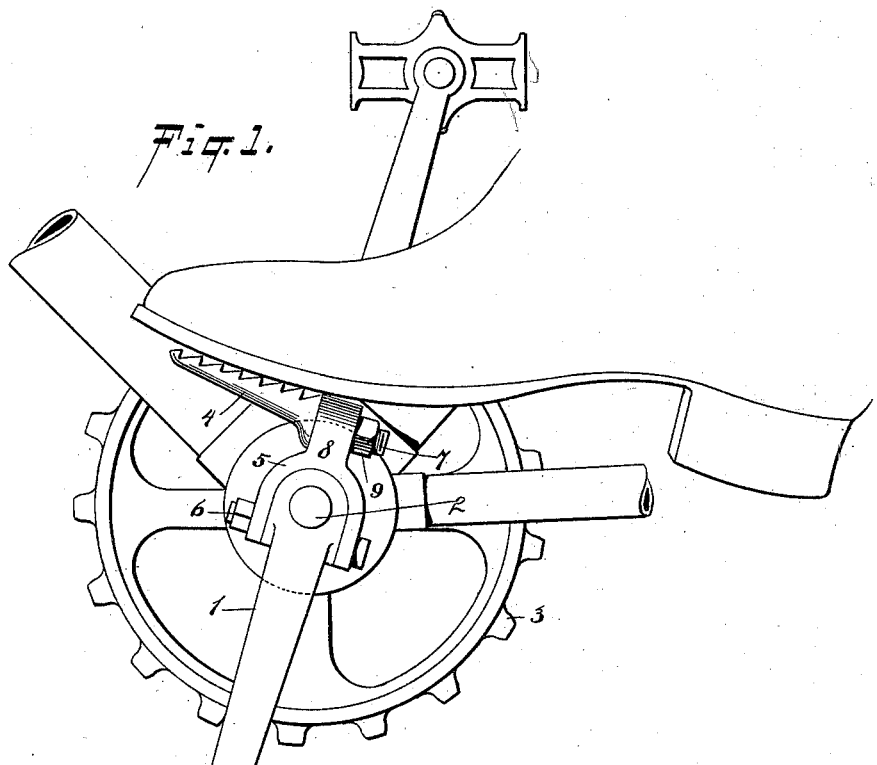
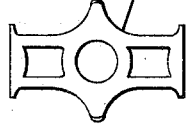
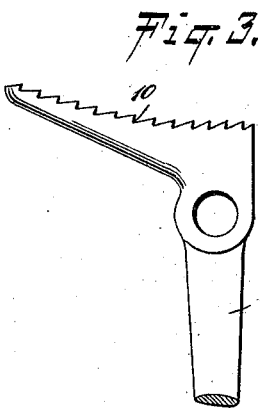
WITNESSES:
William P. Goebel
C. R. Ferguson
INVENTOR
H. G. Borgfeldt.
BY
[signature]
ATTORNEYS.

UNITED STATES PATENT OFFICE.

HEINRICH G. BORGFELDT, OF BROOKLYN, NEW YORK.

BICYCLE-STEP.

SPECIFICATION forming part of Letters Patent No. 598,356, dated February 1, 1898.

Application filed May 17, 1897. Serial No. 636,907. (No model.)

*To all whom it may concern:*

Be it known that I, HEINRICH G. BORGFELDT, of Brooklyn, in the county of Kings and State of New York, have invented a new and Improved Bicycle-Step, of which the following is a full, clear, and exact description.

This invention relates to steps for bicycles, and the object is to provide a step so placed with relation to a pedal-crank that motion will be immediately imparted to the bicycle upon the rider bringing his weight upon the step, thus making it unnecessary to take a few steps before mounting, as is ordinarily the case, and, further, to facilitate the mounting, which is generally difficult for beginners.

The invention comprises a step extended at an angle from a pedal-crank at its shaft-bearing end.

The invention further consists in the construction and combination of parts, as will be hereinafter fully described, and pointed out in the appended claims.

Reference is to be had to the accompanying drawings, forming a part of this specification, in which similar characters of reference indicate corresponding parts in all the views.

Figure 1 is a side elevation of a portion of a bicycle-frame and a pedal-crank, showing my invention as applied thereto. Fig. 2 is a perspective view of the step detached from the pedal-crank, and Fig. 3 is a side elevation of a portion of a crank and showing the step as integral therewith.

Referring to the drawings, 1 designates a pedal-crank on the shaft 2 at the side of the frame opposite that of the sprocket-wheel 3. Extended at an angle (here shown as a right angle) to the pedal-crank 1 is a step 4. This step extends from that end of the pedal-crank that engages with the pedal-shaft, and when the pedal-shaft is in its downward position the said step will extend forward.

In Fig. 1 I have shown the step as extended from a yoke 5, adapted to engage over the end of the pedal-crank, and a bolt 6 is passed through openings in the members of said yoke and through an opening in the pedal-crank. This bolt 6 may take the place of the cotter-bolt usually employed for attaching the pedal-crank to the shaft. The step is serrated on its upper surface, and, as here shown, it is removably connected to the yoke 5—that is, it is provided with a screw-threaded shank 7, extended through an upwardly-projected stud 8 on the yoke and engaged by a clamping-nut 9.

In Fig. 3 I have shown a step 10, formed integral with the crank 11.

In using this device the bicycle should be moved along until the pedal-crank having the step thereon extends downward at a slight forward angle, and the pedal at the opposite side will extend upward at a slight rearward angle or, in other words, parallel with the crank having the step. When in this position, the step will extend forward at a slight upward angle. The rider will place his left foot on the step, and then by raising the body the pressure on the step will cause the bicycle to move forward, and when the rider is seated in the saddle the right foot will be placed upon the right pedal, which will be the right position for quick engagement.

Of course in mounting the rider will have his hands on the handle-bar, and as this step is much nearer the handle-bar than is the step as ordinarily arranged it is obvious that the act of mounting will be rendered much easier, and, further, there will be no difficulty in finding the pedals, with which riders, especially beginners, have to contend.

Having thus described my invention, I claim as new and desire to secure by Letters Patent—

1. In a bicycle, a step extended from a pedal-crank at its shaft-bearing end, substantially as specified.

2. A pedal-crank for a bicycle, a step extended at right angles thereto from its shaft-bearing end, and means for removably connecting the step with the crank, substantially as specified.

3. A crank for a bicycle, a step, and a yoke for removably connecting the step to the crank, substantially as specified.

4. The combination with a bicycle-crank, of a yoke, means for detachably connecting said yoke to the shaft-bearing end of the crank, and a step removably connected to said yoke, the said step being arranged at an angle to the crank, substantially as specified.

HEINRICH G. BORGFELDT.

Witnesses:
EVERARD BOLTON MARSHALL,
C. R. FERGUSON.